UNITED STATES PATENT OFFICE.

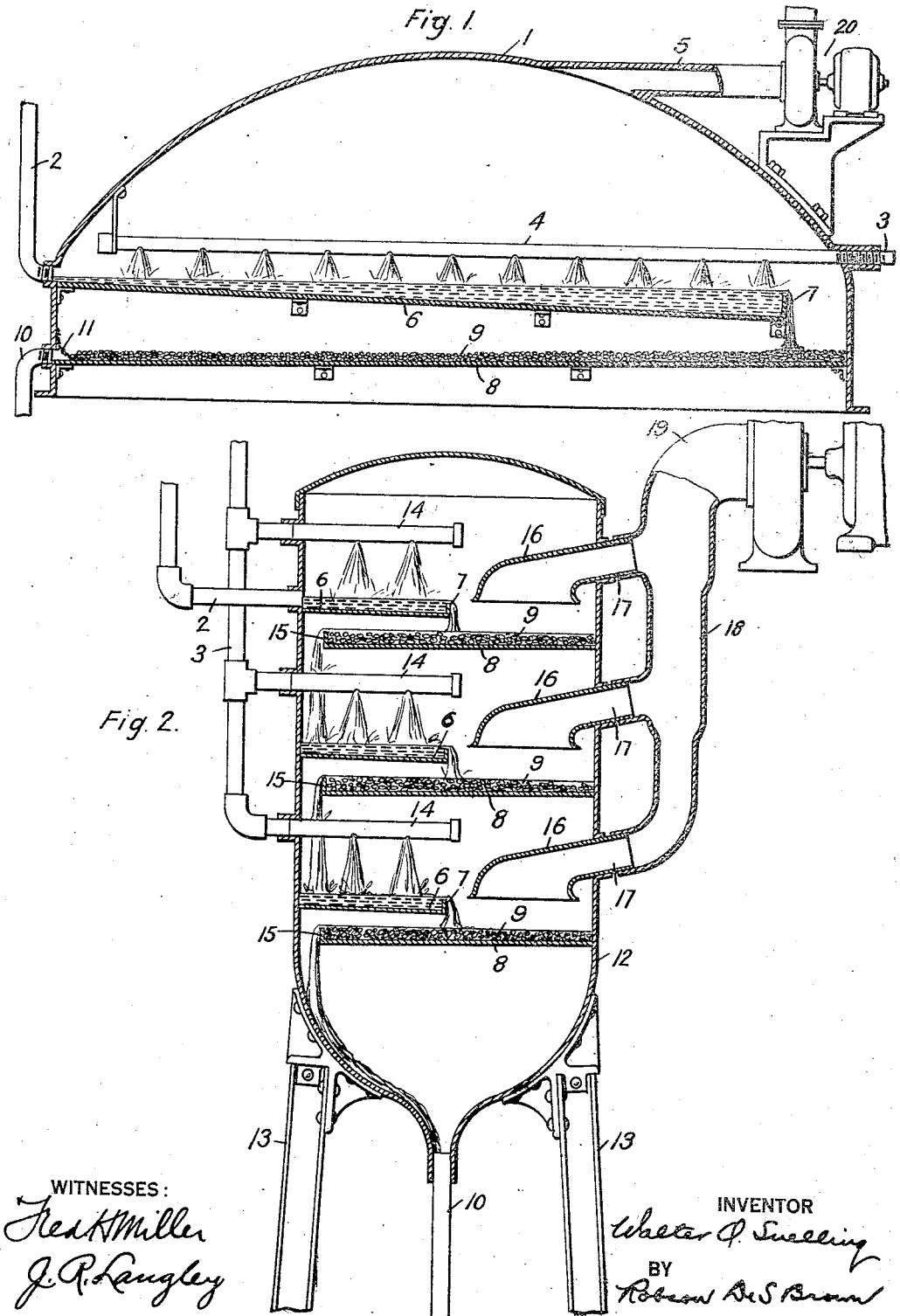

WALTER O. SNELLING, OF LONG ISLAND CITY, NEW YORK.

PREPARATION OF METAL NITRATES.

1,285,824.  Specification of Letters Patent.  Patented Nov. 26, 1918.

Application filed May 10, 1916. Serial No. 96,583.

*To all whom it may concern:*

Be it known that I, WALTER O. SNELLING, a citizen of the United States, and a resident of Long Island City, in the county of Queens and State of New York, have invented a new and useful Improvement in the Preparation of Metal Nitrates, of which the following is a specification.

My invention relates to the manufacture of metal nitrates, particularly nitrates of the alkaline earth metals, and it has for one of its objects to provide a rapid and economical process of producing pure metal nitrates from solutions of sulfids and sulfhydrates.

Another object of my invention is to provide a simple and effective system of apparatus for carrying out the above-indicated process in a continuous manner.

Alkaline earth metal nitrates, particularly barium nitrate and strontium nitrate, are commonly prepared by heating the corresponding sulfates with coal slack, or other carbonaceous reducing agent, leaching the resulting ash with water to extract the metal as sulfids and sulfhydrates, treating the leachings or "black ash liquor" with dilute nitric acid, concentrating by evaporation, and crystallizing out the metal nitrate.

In the foregoing process, if the aqueous solution of sulfids and sulfhydrates is too concentrated, the hydrogen sulfid evolved on the addition of nitric acid exerts a marked reducing action upon the free nitric acid present, converting part of it into ammonium nitrate. This reduced portion of the nitric acid is therefore wasted, and the ammonium nitrate so produced remains as an impurity in the final product unless removed by careful crystallization, and may also contaminate the mother liquor to such an extent that the full crop of barium or strontium nitrate crystals cannot be obtained.

According to my present invention, I follow the general process outlined above, but I employ much stronger solutions of nitric acid and of the sulfid and sulfhydrate leachings than have heretofore been used, and prevent the harmful reduction of the nitric acid to ammonium nitrate by mixing the acid with the leachings in an evacuated chamber and by applying continuous suction to the reaction chamber in order to withdraw the hydrogen sulfid as fast as it is formed. The reaction apparatus is preferably provided with means for bringing the acid and the sulfid solution into contact in thin sheets or films having large areas exposed to the reduced-pressure atmosphere, in order that the hydrogen sulfid may escape from the liquid as readily as possible.

Two forms of apparatus suitable for carrying out my process are shown in the accompanying drawing, in which Figure 1 is a side view, mainly in longitudinal section, of a treating vessel having a single mixing shelf or trough, and Fig. 2 is a side view, also in section, showing a tower provided with a series of mixing shelves and a corresponding number of charging and exhaust pipes.

Referring first to Fig. 1 of the drawing, a gas-tight vessel 1, constructed of any suitable acid-resisting material, is provided with an inlet pipe 2 for black ash liquor and with another inlet pipe 3 for nitric acid, the inlet pipe 3 being attached to a long spray tube 4 which is suitably perforated, as shown, in order to project many fine streams of acid into the black ash liquor below. The vessel 1 may be circular, rectangular or of any other desired form, and is provided with a gas outlet pipe 5, which may be attached to a vacuum pump 20 or other suitable exhaust apparatus.

Below the spray tube 4 is a shelf or trough 6, which is shown as being slightly inclined away from the inlet pipe 2, but which may be substantially horizontal. The liquid from the trough 6 falls over a dam 7 upon a second plate or shelf 8 upon which are preferably disposed a series of baffles or a layer of silica pebbles or other fragmentary obstructions, such as are shown at 9, the function of these obstructions being to expose the liquid in thin films to the reduced-pressure atmosphere as long as possible after reaction. Adjacent to the shelf 8 is an outlet communicating with a discharge pipe 10, which preferably extends to a receiving tank located more than thirty feet below the level of the trough 8, in order that the vacuum in the vessel 1 may be maintained without preventing the free outflow of liquid. A screen 11 may be provided to prevent any of the pebbles 9 from entering the pipe 10.

The apparatus shown in Fig. 2 consists of a tower 12 supported upon standards 13, and provided with a series of horizontal or slightly inclined shelves which correspond to the shelves 6 and 8 in Fig. 1 and are similarly designated. The upper shelf 6 is adjacent to an opening in the wall of the tower which communicates with the black ash liquor inlet pipe 2. The acid pipe 3, in this construction, is connected to a series of short perforated pipes 14, each of which extends through the wall of the tower above one of the shelves 6. The shelves 6 are provided with dams 7, as in the structure shown in Fig. 1, for maintaining a shallow layer of liquid thereon, and the shelves 8 are similarly provided with dams 15 and carry silica pebbles 9 or other suitable obstructions for exposing large surfaces of the liquid. An outlet pipe 10 is provided, as in the apparatus of Fig. 1, to receive the liquid from the lowest shelf 8.

Disposed above each of the shelves 8 is a gas collector 16 communicating, through a short pipe 17, with a vertical pipe 18 connected to an exhaust pipe 19 through which the gases liberated within the tower are drawn by suitable suction apparatus.

The two forms of apparatus which I have shown and described are similar in their operation. When barium nitrate is to be produced, crude barium sulfate is mixed with about one-fifth of its weight of coal slack and heated in the usual manner, the resulting ash being bleached with water to produce the so-called black ash liquor. The black ash liquor, containing sulfids and sulfhydrates and preferably fairly concentrated, is introduced into the reaction apparatus through the pipe 2 and nitric acid, also fairly concentrated, is separately introduced through the pipe 3 and the perforated tubes 4 or 14. Hydrogen sulfid is evolved, partly in the mixing troughs 6, but mainly upon the shelves 8, where the liquid is broken up into many thin films of large area. Suction being constantly maintained through the exhaust pipe 5 or 19, the hydrogen sulfid is removed from the liquid substantially as fast as it is formed, and the liquid issuing through the pipe 10 is therefore uncontaminated with reduction products. The hydrogen sulfid gas thus collected is available for use in a variety of chemical operations.

My process effects a considerable saving both in time and expense, as compared with prior processes of the same general kind. Not only is the product exceedingly pure, because of the rapid removal of hydrogen sulfid, but the concentration of the solutions employed greatly lessens the evaporation necessary in crystallizing the nitrates.

In order that the above-described apparatus may operate automatically without using an excess of either black ash liquor or acid, it is of course necessary that the two liquids be supplied in proper proportions, and special precautions are required on account of the evacuation of the reaction chamber, which prevents measuring the liquids by ordinary constant-level methods and the like. The necessary regulation may be accomplished in several ways, for example, by means of the fluid-measuring device described and claimed in my copending application for Letters Patent, Serial No. 55,753, filed October 14, 1915. When this form of device is employed, the black ash liquor may be pumped at a constant rate through the pipe 2 of the present apparatus, and may actuate the metering device of my copending application to deliver nitric acid to the pipe 3 in definite and proportional quantities.

It is to be understood that the specific apparatus and process steps which I have shown and described may be variously modified without departing from the essentials of my invention, and therefore that no limitations are to be imposed upon my invention except such as are indicated in the appended claims.

I claim as my invention:

1. The process that comprises treating a sulfid-containing liquid, under sub-atmospheric pressure, with an acid capable of reduction by hydrogen sulfid.

2. The process that comprises treating an aqueous solution of an alkaline earth metal sulfid with nitric acid under sub-atmospheric pressure.

3. The process that comprises treating an aqueous solution of barium sulfid and sulfhydrate with nitric acid under sub-atmospheric pressure.

4. The process that comprises introducing into a mixing chamber an aqueous sulfid solution and an acid capable of reduction by hydrogen sulfid, and maintaining sub-atmospheric pressure within the said chamber.

5. The process that comprises treating an aqueous solution containing an alkaline earth metal sulfid with nitric acid, disposing the mixture in thin sheets, and maintaining sub-atmospheric pressure above the said sheets of liquid.

6. The process that comprises spraying nitric acid into a solution containing barium sulfid, disposing the mixture in thin sheets, and maintaining sub-atmospheric pressure above the said sheets of liquid.

In testimony whereof, I have hereunto subscribed my name this 4th day of May 1916.

WALTER O. SNELLING.